United States Patent
Nomura

(10) Patent No.: US 7,809,240 B2
(45) Date of Patent: Oct. 5, 2010

(54) CONTENT PROVISION SYSTEM AND ASSOCIATED METHODOLOGY OF CONTROLLING DISTRIBUTION OF CONTENT

(75) Inventor: Takashi Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 1488 days.

(21) Appl. No.: 10/134,633

(22) Filed: Apr. 30, 2002

(65) Prior Publication Data

US 2002/0174442 A1    Nov. 21, 2002

(30) Foreign Application Priority Data

May 2, 2001 (JP) ............... 2001-135067

(51) Int. Cl.
*H04N 5/91* (2006.01)
*H04N 9/64* (2006.01)

(52) U.S. Cl. ............... 386/68; 386/69; 386/70; 348/714; 348/715; 348/716; 348/717; 348/718; 348/719

(58) Field of Classification Search .......... 725/88, 725/90–94; 386/46, 68–70; 348/714–719
See application file for complete search history.

(56) References Cited

U.S. PATENT DOCUMENTS

| 5,414,455 | A | * | 5/1995 | Hooper et al. ............... 725/88 |
| 5,748,234 | A | * | 5/1998 | Lippincott ............... 348/222.1 |
| 5,854,873 | A | * | 12/1998 | Mori et al. ............... 386/92 |
| 6,445,738 | B1 | * | 9/2002 | Zdepski et al. ......... 375/240.01 |
| 6,542,695 | B1 | * | 4/2003 | Akiba et al. ............... 386/125 |
| 6,807,363 | B1 | * | 10/2004 | Abiko et al. ............... 386/68 |
| 7,219,364 | B2 | * | 5/2007 | Bolle et al. ............... 725/105 |
| 7,272,298 | B1 | * | 9/2007 | Lang et al. ............... 386/83 |
| 2001/0033343 | A1 | * | 10/2001 | Yap et al. ............... 348/734 |

FOREIGN PATENT DOCUMENTS

| JP | 9-107519 | 4/1997 |
| JP | 9-160753 | 6/1997 |
| JP | 9-322125 | 12/1997 |
| JP | 11-177962 | 7/1999 |
| JP | 2000-285598 | 10/2000 |

* cited by examiner

*Primary Examiner*—Thai Tran
*Assistant Examiner*—Daquan Zhao
(74) *Attorney, Agent, or Firm*—Oblon, Spivak, McClelland, Maier & Neustadt, L.L.P.

(57) ABSTRACT

When various content is broadcasted via the Internet, a user is free from restriction of time and space and user's desired content is provided. The content is controllably recorded and read to a random-access recording medium via a network, and at least the content read from the recording medium is transmitted to the network.

4 Claims, 15 Drawing Sheets

CONTENT PROVISION SYSTEM AND ASSOCIATED METHODOLOGY OF CONTROLLING DISTRIBUTION OF CONTENT

BACKGROUND OF THE INVENTION

1. Field of the Invention

The present invention relates to a content provider apparatus, a content provider method, and a recording medium, which can be applied to the broadcasting of various content via the Internet. According to the present invention, content is controllably recorded and read to a random-access recording medium via a network and at least the content read from the recording medium is transmitted. Thus, a user is free from restriction of time and space and user's desired content can be provided.

2. Description of the Related Art

Conventionally, in video equipment having recording means such as a hard disk device, a user is free from the restriction of time to improve the convenience.

In other words, in such video equipment, a video signal and an audio signal inputted by using a digital signal are compressed and recorded, a video signal and an audio signal inputted by using an analog signal are converted into a digital signal and thereafter are compressed and recorded, and these recorded signals are read and outputted to a monitor device.

In the video equipment having the hard disk device, a broadcasted program is viewed later by a function for recording and reading data from the hard disk device, and it is read while being recorded (so-called, follow-up reading), thereby viewing various content by time shift. Thus, the user is free from the restriction of time.

On the contrary, in information equipment such as a personal computer, various information can be accessed from a remote position via the Internet. By using this function, live content can be distributed. A user of the content distribution via the Internet is free from restriction of space and can use various content.

Various video equipment using the above-mentioned hard disk device has only a function for outputting a read video signal to video equipment such as a monitor device. Therefore, although the user is free from the restriction of time, there is problem in that he is not free from the restriction of space.

On the other hand, in a server connected to a network, the user as a client is free from the restriction of space by storing video signals, etc. and distributing them to the client. However, the server has a problem in that desired content of the user is not stored. Accordingly, there is a problem in that the user is not free from the restriction of time, like the video equipment.

SUMMARY OF THE INVENTION

It is an object of the present invention to provide a content provider apparatus, a content provider method, and a recording medium, in which a user is free from restriction of time and space and user's desired content can be provided.

According to a first aspect of the present invention, there is provided a content provider apparatus for providing content for a client terminal, comprising: input means for inputting predetermined content; recording and reading means for sequentially recording the content inputted by the input means to a random-access recording medium and reading the content recorded to the recording medium; communication means for receiving a request from the client terminal via a network and transmitting the content read from the recording medium to the network; and control means for controlling the operation of the recording and reading means in accordance with the request received by the communication means, wherein the control means reads the content recorded to the recording medium while recording the content to the recording medium when the transmission of the content is requested from the client terminal during the recording of the content inputted by the input means to the recording medium by the recording and reading means.

According to a second aspect of the present invention, there is provided a content provider method for distributing content in a content provider system for providing the content for a client terminal, comprising the steps of: inputting predetermined content; sequentially recording the input content to a random-access recording medium; receiving a request from the client terminal via a network; reading the content recorded to the recording medium; transmitting the content read from the recording medium to the network; and controlling the operation for reading the content recorded to the recording medium while recording the content to the recording means when the transmission of the content is requested from the client terminal during the recording of the input content to the recording medium.

According to a third aspect of the present invention, there is provided a recording medium for recording a program to execute processing for providing content for a client terminal in an information processing apparatus, wherein the program comprises the steps of: inputting predetermined content; sequentially recording the input content to a random-access recording medium; receiving a request from the client terminal via a network; reading the content recorded to the recording medium; transmitting the content read from the recording medium to the network; and controlling the operation for reading the content recorded to the recording medium while recording the content to the recording means when the transmission of the content is requested from the client terminal during the recording of the input content to the recording medium.

In the present invention, as mentioned above, the content is controllably recorded and read to the random-access recording medium via the network. At least the content read from the recording medium is transmitted to the network and, therefore, a user is free from the restriction of time and space and his desired content can be provided.

DESCRIPTION OF THE PREFERRED EMBODIMENTS

Hereinbelow, a detailed description is given of embodiments of the present invention with reference to the drawings.

(1) First Embodiment (1-1) Configuration of First Embodiment

Figure 2:
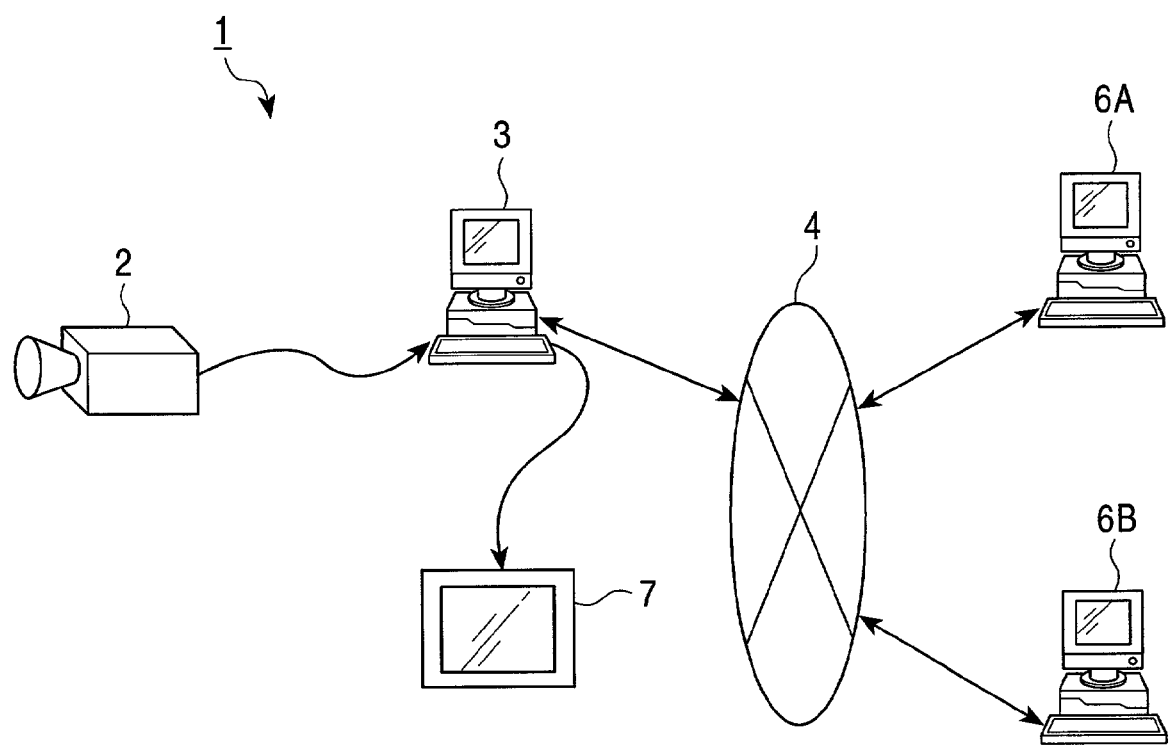
FIG. 2 is a diagrammatic view showing a content distribution system according to the first embodiment of the present invention.

FIG. 2 is a diagrammatic view showing a content distribution system according to a first embodiment of the present invention. A content distribution system 1 downloads to a personal computer 3, content comprising a video signal and an audio signal (hereinafter, referred to as an AV signal) obtained from a camera 2, an analog television broadcast, analog AV equipment, etc., and transmits the downloaded content in real time to a network 4 while recording the content. Further, the content distribution system 1 transmits the content to the network 4 by time shift. In addition, the content distribution system 1 outputs the content distributed in real time as mentioned above or the content distributed by the time shift to a monitor device 7, thus to monitor a video image.

Figure 1:
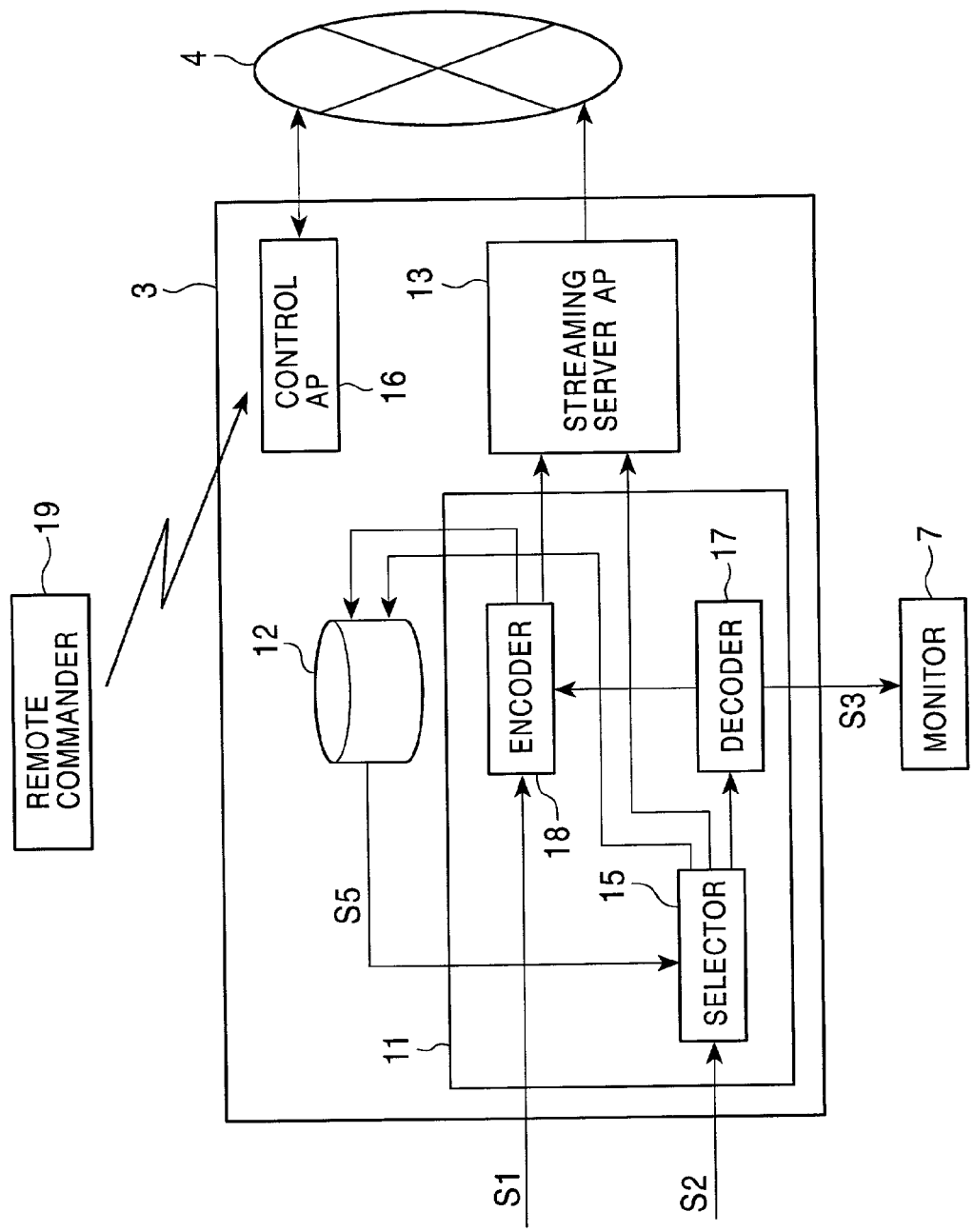
FIG. 1 is a block diagram showing in detail a personal computer according to a first embodiment of the present invention.

FIG. 1 is a block diagram showing the personal computer 3 in the content distribution system 1. In addition to the configuration of normal personal computers, the personal computer 3 has an input terminal of an AV signal S1 comprising an analog signal, an input terminal of an AV signal S2 comprising a digital signal in various formats, and an analog output terminal of an AV signal S3 to the monitor device 7, etc. The AV signal S2 comprising the digital signal correspond to AV signals such as a digital video signal comprising a composite signal and a component signal, an AV signal formed by combination of audio signals having various sampling frequencies, a DVCR (Digital Video Cassette Recorder)-SD (Standard Definition) signal, and MPEGs (Moving Picture Experts Groups) 1 to 4. The AV signals S2 comprising the above-mentioned AV signals can be inputted by the personal computer 3. Incidentally, the AV signals comprising the digital signal correspond to AV signals, comprising digital signals which are received via a digital television broadcast (CS, BS, or ground wave) or various networks.

An encoder and decoder unit 11 comprises a DSP, and outputs the AV signal S1 comprising the analog signal and the AV signal S2 comprising the digital signal to a hard disk device 12 by signal processing when necessary. After processing the AV signals S1 and S2 and an AV signal S5 read by the hard disk device 12 when necessary, the encoder and decoder unit 11 outputs the AV signals to the network 4 via a streaming server application (hereinafter, referred to as a streaming server AP in the figure) 13 and outputs them to the monitor device 7 or the like.

Consequently, the encoder and decoder unit 11 transmits recorded live content or the content by time shift to the network 4 while recording the content comprising the AV signals captured by the camera 2, etc. to the hard disk drive 12, thus to monitor the content.

Specifically speaking, in the encoder and decoder unit 11, a selector-15 switches the operation under the control of a control application program (hereinafter, referred to as a control AP in the figure) 16. Thus, the AV signal S2 inputted based on the digital signal and the AV signal S5 read from the hard disk device 12 are outputted to the streaming server application 13, and the real-time content or the time-shift content is transmitted to the network 4.

The selector 15 outputs via a decoder 17, the AV signals S2 and S5 to the hard disk device 12, the streaming server application 13, and the monitor device 7. Thus, the personal computer 3 records live content to the hard disk device 12, converts a format of the live content and the content read from the hard disk device 12 and distributes them. Further, the live content or the content read from the hard disk device 12 is monitored and recoded again.

In other words, the decoder 17 decodes the AV signals in various formats which are outputted by the selector 15, to the digital video signal comprising the composite signal and the component signal and the AV signals formed by combining the audio signals having various sampling frequencies, and outputs them to an encoder 18. Further, the decoder 17 performs digital/analog processing of the above-decompressed AV signals, generates the AV signal S3 comprising the analog signal, and outputs the generated AV signal S3 to the monitor device 7.

The encoder 18 compresses the AV signals outputted from the decoder 17 to a signal in a format instructed based on the control application program 16, and thereafter outputs the signal to the hard disk device 12. Further, the encoder 18 performs analog/digital processing of the AV signal S1 comprising the analog signal inputted from the input terminal, thereafter, and similarly outputs it to the hard disk device 12. Incidentally, the signal format processed by the decoder 17 and the encoder 18 is a format of AV signals such as the digital video signal comprising the composite signal and the component signal, the AV signal formed by the combination of the audio signals having various sampling frequencies, the DVCR (Digital Video Cassette Recorder)-SD (Standard Definition) signal, and the MPEGs (Moving Picture Experts Groups) 1 to 4. The encoder 18 outputs the AV signal S1 comprising the analog signal inputted from the input terminal under the control of the control application program 16.

The personal computer 3 can output the AV signals via a plurality of systems such as a plurality of systems by different time-shift, to the network 4 in accordance with client terminals 6A and 6B connected to the network 4. Corresponding thereto, the above-mentioned encoder 18, decoder 17, and selector 15 have a plurality of systems so as to process the AV signals having the plurality of systems.

The hard disk device 12 is a recording and reading apparatus having a random-access recording medium, can read and write a signal much faster than a transfer rate of the AV signals so as to simultaneously record and read the AV signals having the plurality of systems, and has a large capacity to record content. Further, in the recording and reading, the hard disk device 12 switches the operation for recording and reading and the AV signal as a processing target every predetermined period. In addition, the hard disk deice 12 inputs and outputs the AV signals via a buffer memory for compression based on the time series and for decompression based thereon and, thus, it can simultaneously record and read the AV signals having the plurality of systems.

Moreover, under the control of the control application program 16, the hard disk device 12 reads the AV signals continuously or discretely in a time-series direction of content or in a tracing direction of the time series. Thus, the content is read based on normal reading or rewinding and reading in a video tape recorder to output the AV signals. Or, the above-read content is read by fast feed and the AV signals are outputted.

The streaming server application 13 forms the AV signals outputted from the encoder and decoder unit 11 into a packet and transmits the packet to the network 4 under the control of the control application program 16.

The control application program 16 is a controller for entirely controlling the personal computer 3 in the content distribution system 1, and controls the operation of the hard disk device 12, etc. in accordance with a request outputted via the network 4 from the client terminals 6A and 6B or in accordance with a remote control signal outputted from a remote commander 19. Further, the control application program 16 is incorporated in the personal computer 3 in such a state that it is stored in a recording medium such as a hard disk device, a semiconductor memory, or an optical disk.

The personal computer 3 can distribute the live content or the content by the time shift on the network 4 in accordance with the client terminal 6A or 6B or user's instruction of the personal computer 3 while recording the live content.

In the content distribution system 1, the client terminals 6A and 6B can view the content distributed via the network 4 based on a dedicated application program. Further, in the content distribution system 1, user's operation is detected on the client terminals 6A and 6B by using a GUI (Graphical User Interface) provided by the dedicated application program, and it is notified to the control application program 16 by using a transport protocol such as an HTTP (Hyper Text Transfer Protocol).

The control application program 16 inputs, as events, the above-obtained notification from the client terminals 6A and 6B and the control instruction from the remote commander 19, manages the events, records the content in response to the request from the client terminals 6A and 6B by executing the processing sequence set to the events, and transmits the live content or the content by the time shift to the client terminals 6A and 6B.

Set to the control application program 16 are a request for distributing the live content, a request for stopping to distribute the live content, a request for recording the content, a request for stopping to record the content, a request for starting to read the content, and a request for stopping to read the content, as the events of requests from the client terminals 6A and 6B.

Herein, the request for distributing the live content is a request for starting to distribute the AV signal S1 or S2 forming the live content. In response to the request for distributing the live content, set as parameters are a session ID for specifying a session of each request, the type of a live input signal for specifying a live AV signal, a digital compressing format whose distribution is requested, for specifying the data compressing format for distribution, and a content distribution destination for specifying the distribution destination.

On the other hand, the request for stopping to distribute the live content is a request for stopping to distribute the live content whose distribution is started in response to the request for distributing the live content. In response to the request for stopping to distribute the live content, a session ID is set as a parameter. The request for recording the content is a request for starting to record the content to the hard disk device 12 and, in response thereto, set as parameters are a session ID, the type of live input signals, and a digital compressing format whose recording is requested, for specifying a data compressing format for recording.

The request for stopping to record the content is a request for stopping to record the content whose recording is started in response to the request for recording the content, and a session ID is set as a parameter. The request for starting to read the content is a request for starting to distribute the content which is recorded to the hard disk device 12 by reading and, in response thereto, set as parameters are a session ID, a digital compressing format whose distribution is requested, a reading start time for specifying a reading start position of the content, a step time for specifying a reading speed of the content, a distribution destination of the content, and a file name for specifying the content to be read. On the other hand, the request for stopping to read the content is a request for stopping the processing whose read and distribution are started in response to the request for starting to read the content, and a session ID is set as a parameter. The step time specifies a frame interval in the continuous read and, when the step time is zero, continuous frames are read in the time-series direction of the content. When the step time is equal to x (x>0), the number of frames indicated by the number x is discretely read in the time-series direction and, thereby, the fast-feed reading is instructed. When the step time is x (x<0), this indicates the reading by the rewinding in the tracing direction of the time-series and, similarly to the fast feed, a reading speed is designated depending in the number x.

The control application program 16 starts or ends the processing sequence of the corresponding event every session ID. Further, in the control application program 16, the parameter or status which is requested is commonly referred to in the processing of the different session IDs, another processing having the same session ID is simultaneously operated. Further, a processing group having a plurality of different session IDs is simultaneously operated. In this case, the personal computer 3 receives and processes a plurality of input signals.

In the following description, a standby status corresponds to no execution of the recording and distribution of the content, and a live status corresponds to the distribution of the live content. Further, a recording status corresponds to the recording of the content to the hard disk device 12, including a status for distributing the live content while recording it. A reading status corresponds to the reading and distribution of the content from the hard disk device 12, and a time-shift status corresponds to time shift in which the content is recorded to the hard disk device 12 and the recorded content is simultaneously read and distributed, that is, "follow-up reading".

Figure 3:
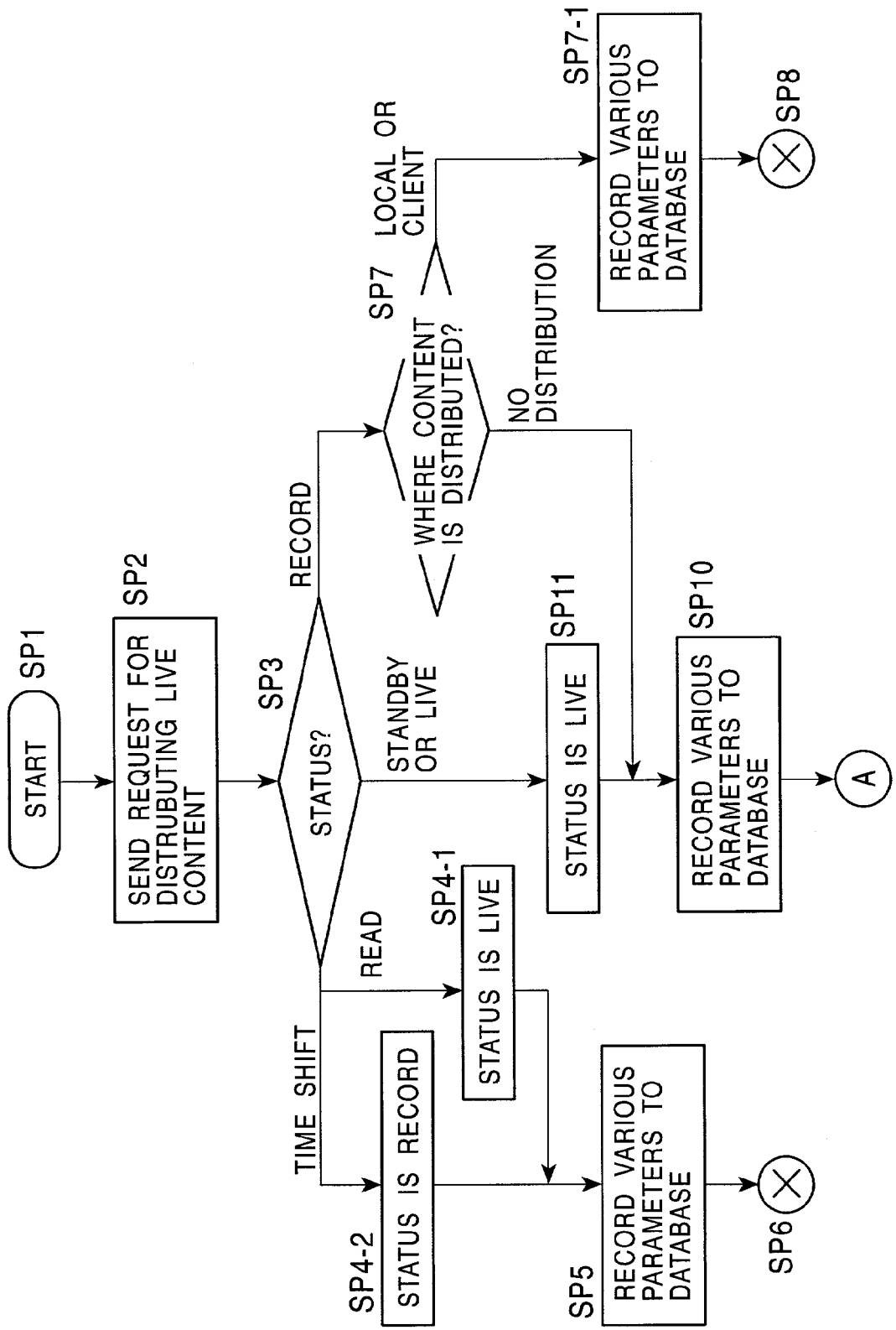
FIG. 3 is a flowchart showing the processing sequence of a control application program when a request for distributing live content is inputted.

FIG. 3 is a flowchart showing the transition of the statuses in response to the requests. Under the control application program 16, the status is determined in response to the requests and the operation is switched. As a result of switching the operation, the status is switched, thereby recording or distributing the content in response to the request from the client terminal 6A or 6B or in response to the operation of the remote commander 19.

In other words, under the control application program 16, even in any status, the processing sequence advances to step SP2 from step SP1 when the event of the request for distributing the live content is received. In step SP2, the parameter set to the event of the request for distributing the live content is obtained. In step SP3, the current status is determined. If the current status is "time shift" or "read", the content is currently distributed to the client. Thus, under the control application program 16, when the status is read, the processing sequence shifts to step SP4-1 whereupon the status is set to "live". If the status is "time shift", the processing sequence advances to step SP4-2 whereupon the status is set to "record". In step SP5, the parameter obtained in step SP2 is recorded to a database (not shown), then, the processing sequence advances to step SP6 whereupon the processing sequence ends. By setting the status and recording the content to the database, the control application program 16 cancels the provision of the content based on "read" and "time shift", sets the operation that the content whose distribution is requested is recorded to the hard disk device 12, and completes the processing sequence. Then, the control application program 16 sets the operation that the recorded content can be distributed in response to the request for newly distributing it from the client terminal 6A or 6B. In other words, the control application program 16 selects the AV signal S1 or S2 based on the parameter set to the event of the request for distributing the live content. If a format is different from the format for designating the AV signal S1 or S2, the control application program 16 converts the format into the format designated by the decoder 17 or the encoder 18 when necessary, and records the converted content to the hard disk device 12.

On the contrary, if the status is "record", the live content is being currently recorded on the corresponding client terminal. Thus, the processing sequence advances to step SP7 based on the determination of the status in step SP3. In step SP7, it is determined where the content is distributed. If the current content is distributed to the client terminal or the monitor device 7 as a local terminal, the control application program 16 recognizes that the live content is being distributed and, in step SP7-1, records the parameter obtained in step SP2 to a database (not shown) while the status is set to "record". Then, the processing sequence advances to step SP8 whereupon the processing sequence ends. Thus, the control application program 16 bypasses the event of the request for distributing the live content and completes the processing because the requested content is being recorded or distributed.

If no content is distributed, the processing sequence shifts to step SP10 from step SP7. In step SP10, the parameter obtained in step SP2 is recorded to the database (not shown). Consequently, the control application program 16 continues the recording of the content which is being recorded.

If the status is "standby" or "live", the control application program 16 shifts to step SP11 from step SP3. In step SP11, the status is set to "live" and then the distribution of the live content is started. Then, in step SP10, the parameter obtained in step SP2 is recorded to the database (not shown).

Figure 4:
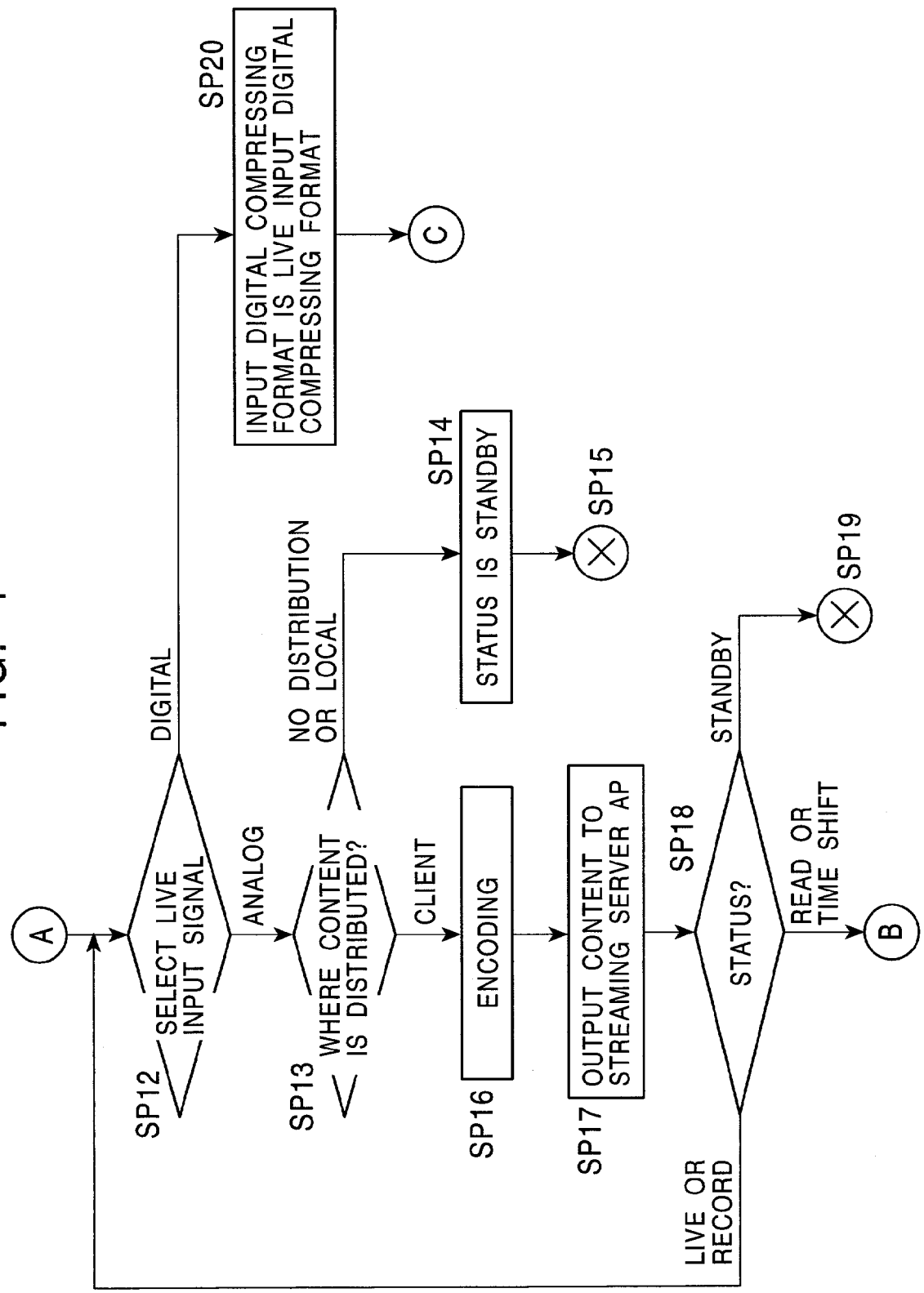
FIG. 4 is a flowchart showing the continuance of the processing sequence shown in FIG. 3.

By recording the parameter of the request for distributing the live content in step SP10 depending on the recording status or live status, the control application program 16 advances to step SP12 (refer to FIG. 4). Herein, the control application program 16 determines the live input signal based on the parameter of the request for distributing the live content. When the live content designated by the client is based on the AV signal S1 consisting of the analog signal in step SP13, it is determined where the content is distributed based on the parameter of the request for distributing the live content.

If it is determined that the content is distributed to a local terminal or no content is distributed, the output of the decoder 17 is outputted to the monitor device 7. Thereafter, the processing sequence advances to step SP14 whereupon the status is set to "standby" and the content distribution is canceled. Then, the processing sequence advances to step SP15 whereupon the processing sequence ends. On the contrary, when the content is distributed to the client terminal, the processing sequence advances to step SP16 whereupon the control application program 16 sets the operation of the encoder 18 so that it processes the AV signal S1 consisting of the analog live signal based on the data compressing format of the parameter of the request for distributing the live content. After the setting in step SP16, in step SP17, the control application program 16 outputs the compressed content to the streaming server application 13, and sets the operation that the content is transmitted to the client who has requested the distribution by using the streaming server application 13.

After entirely setting the operation in response to the request for distributing the live content, the control application program 16 advances to step SP18 and, then, checks the status transition. If the status shifts to "live" or "record", the processing sequence returns to step SP12. On the other hand, the status shifts to "standby", the processing sequence advances to step SP19 whereupon the processing sequence ends. If the status changes to "read" or "time shift", the processing sequence shifts to processing in the reading or time shift, which will be described later.

Figure 5:
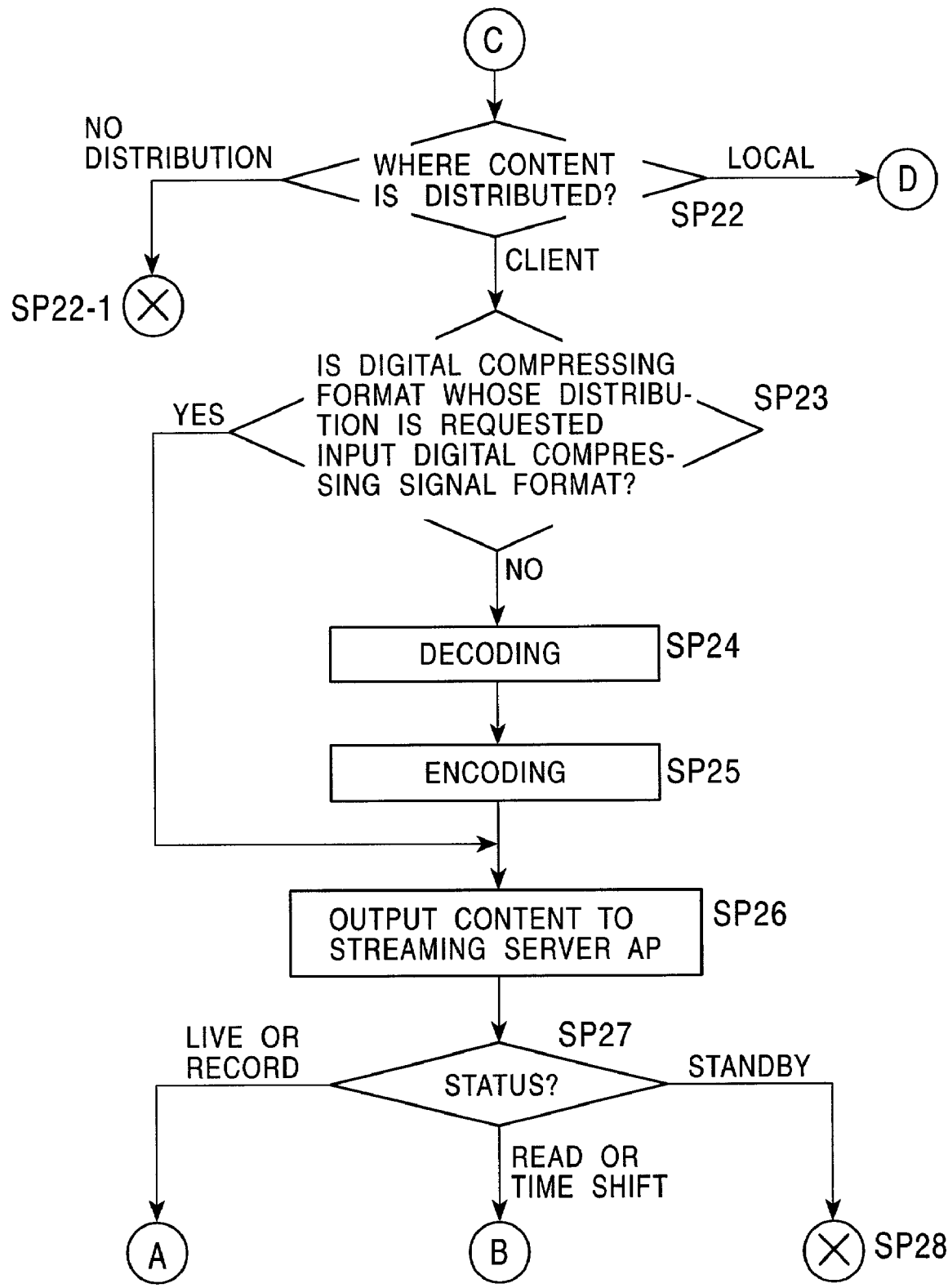
FIG. 5 is a flowchart showing the continuance of the processing sequence shown in FIG. 4.

When the AV signal S2 consisting of the digital signal is designated based on the parameter of the request for distributing the live content, the control application program 16 advances to step SP20 from step SP12. In step SP20, the format of the live AV signal S2 consisting of the digital signal is set to the format of the input signal. Then, the processing sequence advances to step SP22 in FIG. 5. In step SP22, the control application program 16 determines where the content is distributed. If it is determined in step SP22 that no content is distributed, the processing sequence advances to step SP22-1 whereupon the processing sequence ends. If the content is distributed to the client, the processing sequence advances to step SP23 whereupon it is determined whether or not the designated AV signal S2 is based on the requested format. If NO in step SP23, in step SP24, the control application program 16 sets the operation that the AV signal S2 is decoded by the decoder 17. In step SP25, the control application program 16 sets the encoder 18 so that the AV signal S2 decoded by the decoder 17 is converted into a signal in the format corresponding to the request for distributing the content and, then, the processing sequence advances to step SP26.

If the designated AV signal S2 is a signal based on the format corresponding to the request for distribution in step SP23, the control application program 16 advances to step SP26. In step SP26, the control application program 16 outputs the compressed content to the streaming server application 13 and sets the operation that the content is transmitted to the requesting client by using the streaming server application 13.

After entirely setting the operation in response to the request for the distribution, the control application program 16 advances to step SP27. In step SP27, the transition of the status is checked. If the status shifts to "live" or "record", the processing sequence returns to step SP12. On the other hand, if the status shifts to "standby", the processing sequence advances to step SP28 whereupon the processing sequence ends. If the status changes to "read" or "time shift", the processing sequence advances to processing in the reading or time shift, which will be described later.

Figure 6:
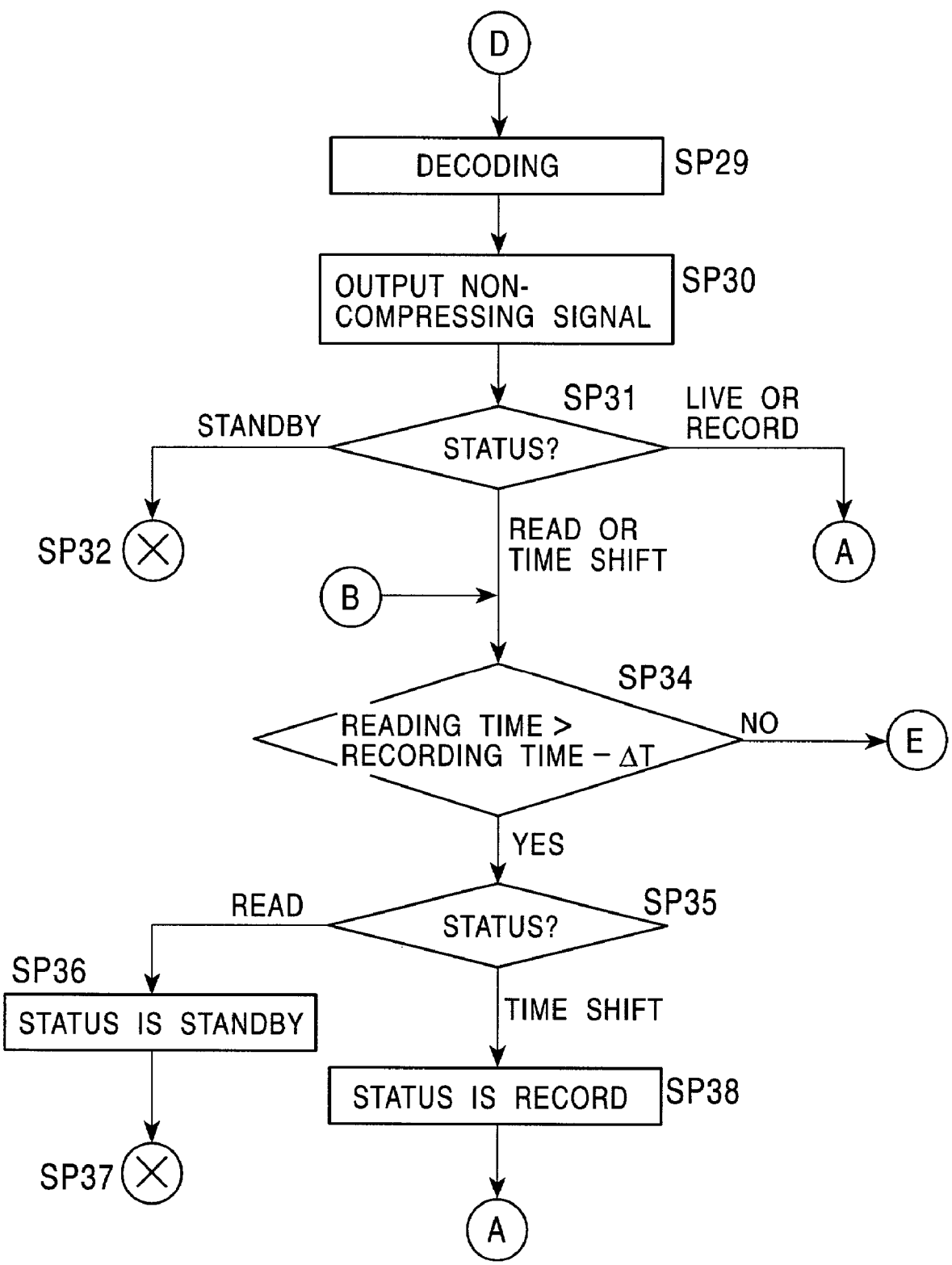
FIG. 6 is a flowchart showing the continuance of the processing sequence shown in FIG. 5.

If it is determined in step SP22 that the content is distributed to the local terminal, the control application program 16 advances to step SP29 in FIG. 6 from step SP22. In step SP29, the control application program 16 sets the operation that the AV signal S2 selected by the selector 15 is decoded by the decoder 17. In step SP30, the control application program 16 switches the operation so that AV signal S2 decoded by the decoder 17 is outputted to the monitor device 7.

After entirely setting the operation in response to the request for the distribution, the control application program 16 advances to step SP31 whereupon the transition of the status is checked. If it is checked in step SP31 that the status shifts to "live" or "record", the processing sequence returns to step SP12. If it is checked in step SP31 that the status shifts to "standby", the control application program 16 shifts to step SP43 whereupon the processing sequence ends. If it is checked in step SP31 that the status shifts to "read" or "time shift", the control application program 16 advances to the processing in the reading or time shift, which will be described later.

In other words, the control application program 16 advances to step SP34 when it is detected in steps SP18, SP27, and SP31 that the status shifts to "read" or "time shift". In step SP34, the control application program 16 determines whether or not the current reading time is far from a recording time of the live content which is recorded to the hard disk device 12, by a predetermined time or more. Based on the determination in step SP34, the control application program 16 determines whether the current reading time is near an end time to record the live content which is recorded to the hard disk device 12 by the so-called fast-feed reading or the current reading catches up with the recording of the live content which is executed by the time shift.

If YES in step SP34, the control application program 16 advances to step SP35 whereupon the status is determined. If it is determined in step SP35 that the status is "read", the control application program 16 sets the status to "standby" and the distribution of the content is stopped. Then, in step SP37, the processing sequence ends. Thus, the control application program 16 sets the status to "standby" and ends the operation when the client instructs the reading of the content and the reading is then completed.

On the contrary, if the status is "time shift", this indicates that the reading catches up with the recording. Thus, the control application program 16 advances to step SP38 from step SP35. In step SP38, the status is set to "record". Then, the processing sequence returns to step SP12 whereupon the processing for selecting the input signal is executed again. The control application program 16 provides the content by the fast-feed and "follow-up reading" and, when the reading of the content catches up with the recording, the control application program 16 entirely switches the operation to the distribution of the live content. Then, the content is continuously provided.

Figure 7:
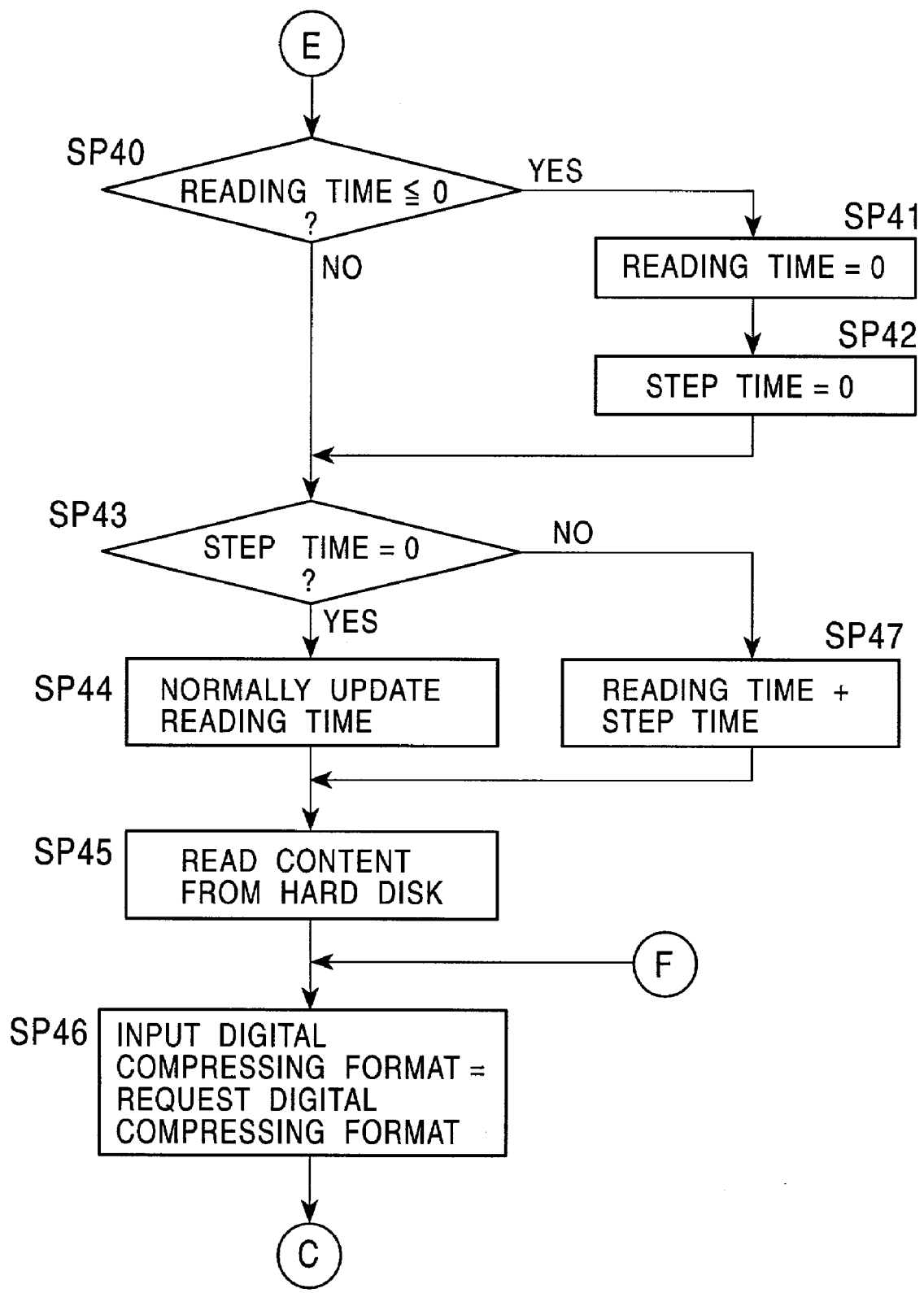
FIG. 7 is a flowchart showing the continuance of the processing sequence shown in FIG. 6.

If NO in step SP34, the control application program 16 advances to step SP40 in FIG. 7 from step SP34. In step SP40, the control application program 16 determines whether or not the reading time traces to the head of the content, namely, whether or not the head of the content is read by the rewinding reading. If YES in step SP40, the control application program 16 advances to step SP41 whereupon the reading time is set to send the content from the head of the live content. In step SP42, the control application program 16 sets the step time to be zero so as to read the content by a normal reading speed, and advances to step SP43.

If NO in step SP40, the control application program 16 directly advances to step SP43 from step SP40. In step SP43, the control application program 16 determines whether or not step time is zero. If YES in step SP43, the processing sequence advances to step SP44 whereupon the control application program 16 sets the operation of the hard disk device 12 so that the frame is read at the reading time. In step SP45, the start of the operation of hard disk device 12 is instructed based on the setting in step SP44. In step SP46, the format of the AV signal recorded to the hard disk device 12 is set to the format of the input signal. Thereafter, the processing sequence returns to step SP22.

Accordingly, when the control application program 16 rewinds and reads data up to the head of the content, it sequentially reads the content from the head of the content at the normal reading time in the time-series direction at the normal reading speed and distributes it.

If NO in step SP43, the control application program 16 advances to step SP47 whereupon the reading time is updated by the step time and the frame is switched to that as a reading target. Then, in step SP45, the control application program 16 continues the processing, when the user instructs the fast-feed reading and then the reading by the rewinding and the reading does not catch up with the recording or the reading does not trace to the head of the content.

Figure 8:
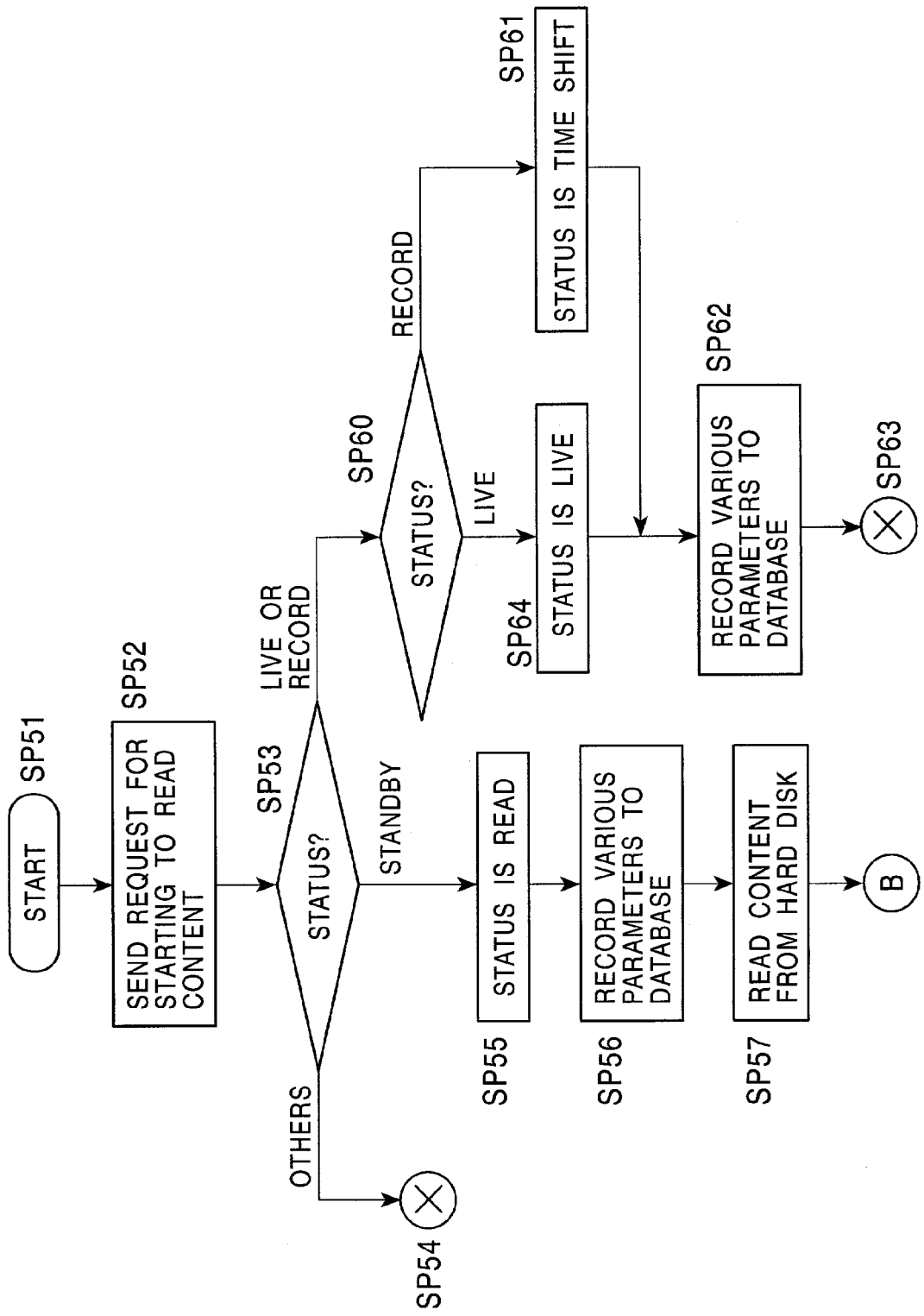
FIG. 8 is a flowchart showing the processing sequence of the control application program when a request for starting to read content is inputted.

FIG. 8 is a flowchart showing the processing sequence when the any status is maintained and the request for starting to read the content is inputted. The control application program 16 reads the content recorded to the hard disk device 12 by the processing in response to the request for starting to read the content, and distributes the content to the client terminal 6A or 6B. Further, the control application program 16 switches the processing corresponding to the request for distributing the content, by the status switching based on the processing.

More specifically, the control application program 16 advances to step SP52 from step SP51 by inputting the request for starting to read the content, and obtains the parameter corresponding to request for starting to read the content. Then, in step SP53, the current status is determined. If the current status is a status other than "standby", "live", and "record", the control application program 16 advances to step SP54 from step SP53 and, in step SP54, the processing sequence ends.

In the standby status, the control application program 16 advances to step SP55 from step SP53. In step SP55, the status is switched to "read". Then, in step SP56, the control application program 16 records the parameter obtained in step SP53 and then advances to step SP57 whereupon the reading of the content from the hard disk device 12 is instructed in accordance with the parameter. Then, in step SP46 in FIG. 7, the control application program 16 reads the content recorded to the hard disk device 12 in response to an instruction for distribution of the content read from the client terminal, and it transmits the content to the client terminal based on the instructed format in response to the request.

In the live or recording status, the control application program 16 advances to step SP60 from step SP53. In step SP60, the control application program 16 determines the status. If it is determined in step SP60 that the status "record", the control application program 16 advances to step SP61 whereupon the status is set to "time shift". Then, in step SP62, the control application program 16 records the parameter obtained in step SP52 to the database and, thereafter, advances to step SP63 whereupon the processing sequence ends. Consequently, when the live content is recorded to the hard disk device 12 and the reading and distribution of the content are instructed, the control application program 16 distributes the content by the so-called "follow-up reading".

In the live status, the control application program 16 advances to step SP64 whereupon it sets the status to "read" and, thereafter, it shifts to step SP62. Consequently, the control application program 16 stops the distribution of the live content and, instead of the stop of the distribution, reads the content recorded to the hard disk device 12 and distributes the read content to the client terminal.

Figure 9:
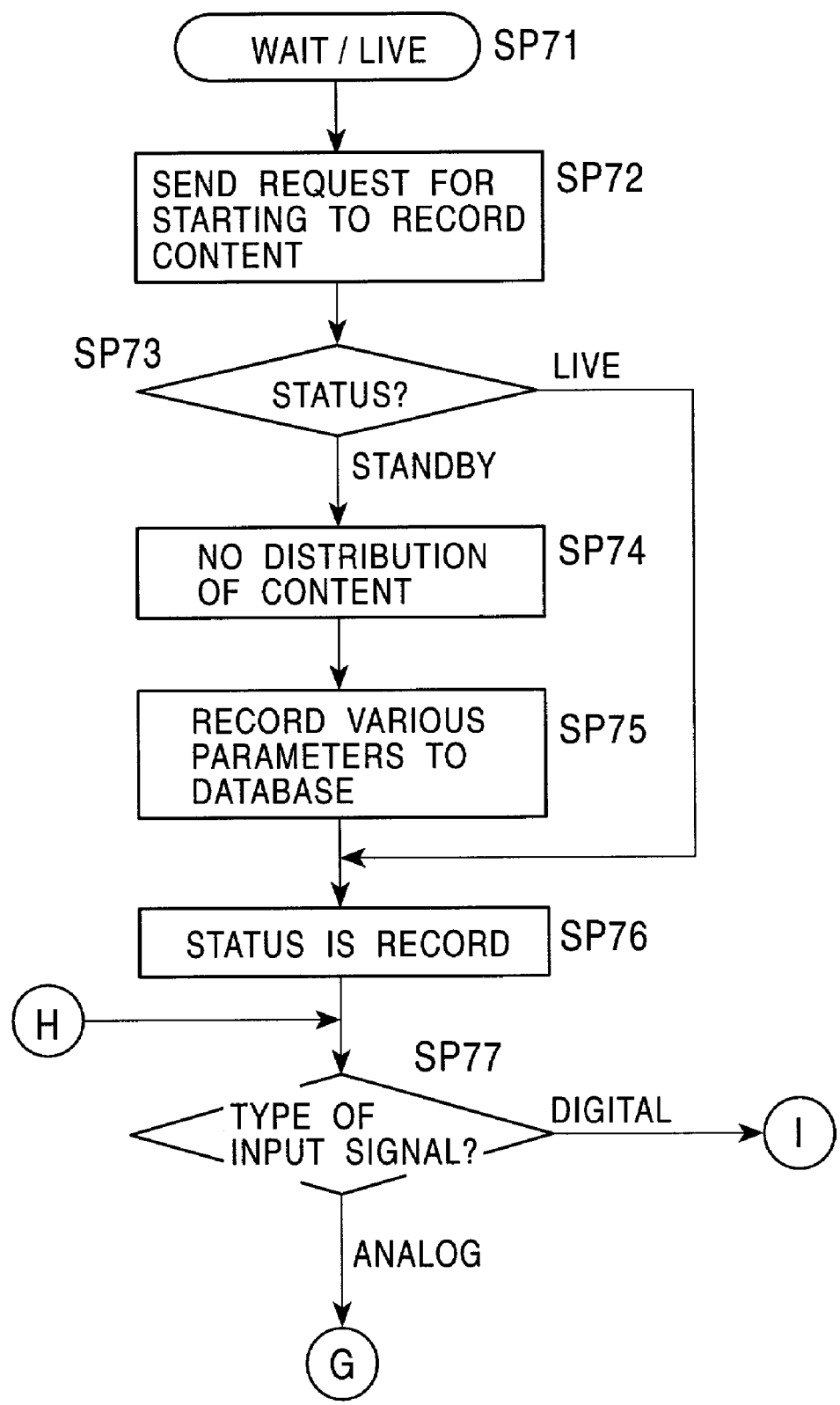
FIG. 9 is a flowchart showing the processing sequence in accordance with the control application program when a request for starting to record the content is inputted.

FIG. 9 is a flowchart showing the processing sequence when the request for starting to record the content is inputted in the standby or live status. Incidentally, when inputting the request for starting to record the content in the status other than "standby" and "live", the control application program 16 sends a notification of an error to the client and bypasses the request.

The control application program 16 advances to step SP72 from step SP71 in accordance with the input of the request for starting to record the content and, in step SP72, it obtains the parameter corresponding to the request for starting to record the content. Then, in step SP73, the control application program 16 determines the current status. If the current status is "standby", the control application program 16 advances to step SP74 from step SP73. In step SP74, the control application program 16 sets the operation so that no content is distributed. Then, in step SP75, the control application program 16 records the parameter obtained in step SP72 to the database and, in step SP76, it sets the status to "record".

If it is determined in step SP73 that the status is "live", the control application program 16 jumps to step SP76 from step SP73. In step SP76, the control application program 16 sets the recording status so that the live content is continuously transmitted.

Figure 10:
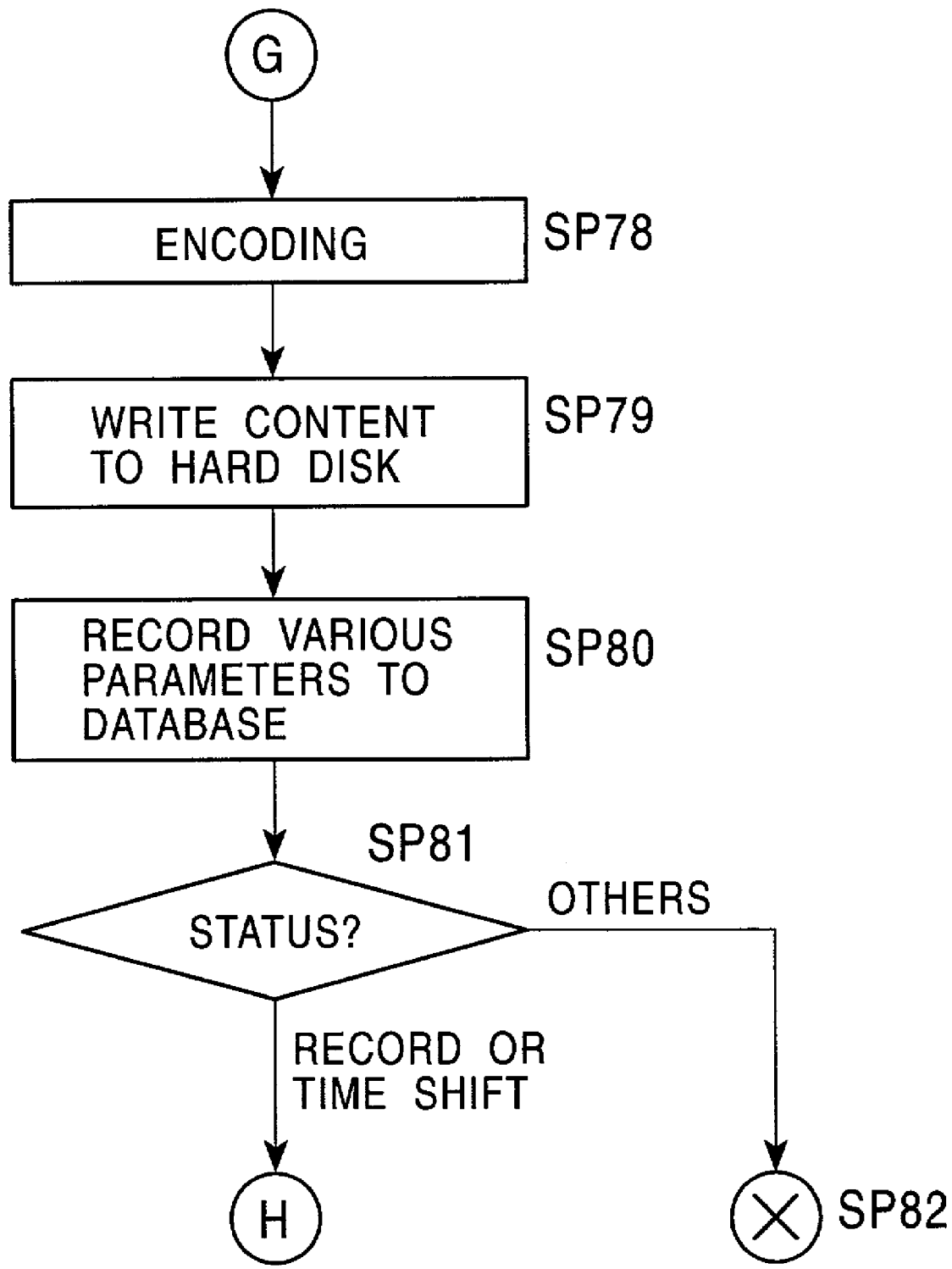
FIG. 10 is a flowchart showing the continuance of the processing sequence shown in FIG. 9.

After setting the recording status in step SP76, the control application program 16 advances to step SP77 whereupon it determines an input signal based on the parameter corresponding to the request for starting to record the live content. If it is determined in step SP77 that the live content designated by the client is based on the AV signal S1 consisting of the analog signal, the control application program 16 advances to step SP78 in FIG. 10. In step SP78, the control application program 16 sets the format of the data compression by the encoder 18 to the format corresponding to the request for the recording. Then, in step SP79, the control application program 16 records an output of the encoder 18 to the hard disk device 12. In step SP80, the control application program 16 updates the recording time and registers information such as the recording time to the database. Consequently, the control application program 16 starts to record the content in response to the request from the client.

After starting to record the content, the control application program 16 advances to step SP81 whereupon the status transition is checked. If the status shifts to the status other than "record" and "time shift", the control application program 16 advances to step SP82 whereupon it completes the processing sequence. If the status is kept to "record" or "time shift", the control application program 16 returns to step SP77.

Figure 11:
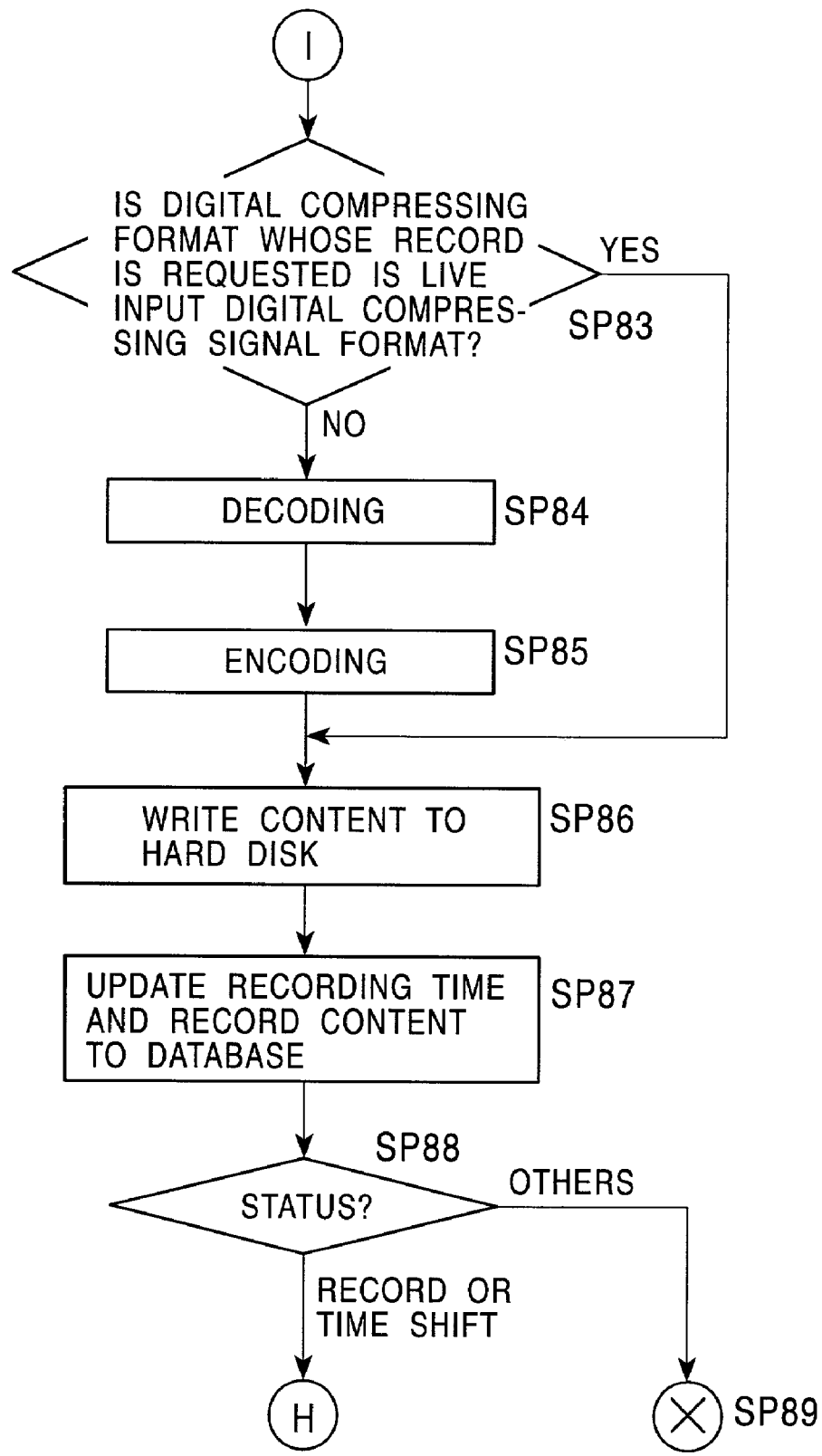
FIG. 11 is a flowchart showing the continuance of the processing sequence shown in FIG. 10.

If it is determined in step SP77 in FIG. 9 that the AV signal corresponding to the request for starting to record the content is the AV signal S2 consisting of the digital signal, the control application program 16 advances to step SP83 in FIG. 11 whereupon it determines whether or not the AV signal S2 is based on the format designated by the request for starting to record the content. If NO in step SP83, the control application program 16 advances to step SP84 whereupon it sets the operation that the AV signal S2 is decoded by the decoder 17. Then, in step SP85, the control application program 16 sets the encoder 18 so that the AV signal decoded by the decoder 17 is converted into a signal in the format corresponding to the request for starting the recording and, then, it advances to step SP86.

If YES in step SP83, the control application program 16 jumps to step SP86 from step SP83. In step SP86, the control application program 16 records the compressed content to the hard disk device 12. Then, in step SP87, the control application program 16 updates the recording time and registers information such as the recording time to the database. Consequently, the control application program 16 starts to record the content in response to the request from the client or the like.

After starting to record the content, the control application program 16 advances to step SP88 whereupon the status transition is checked. If it is checked in step SP88 that the status shifts to the status other than "record" and "time shift", the control application program 16 advances to step SP89 whereupon it ends the processing sequence. If it is checked in step SP88 that the status is kept to "record" or "time shift", the control application program 16 returns to step SP77.

Figure 12:
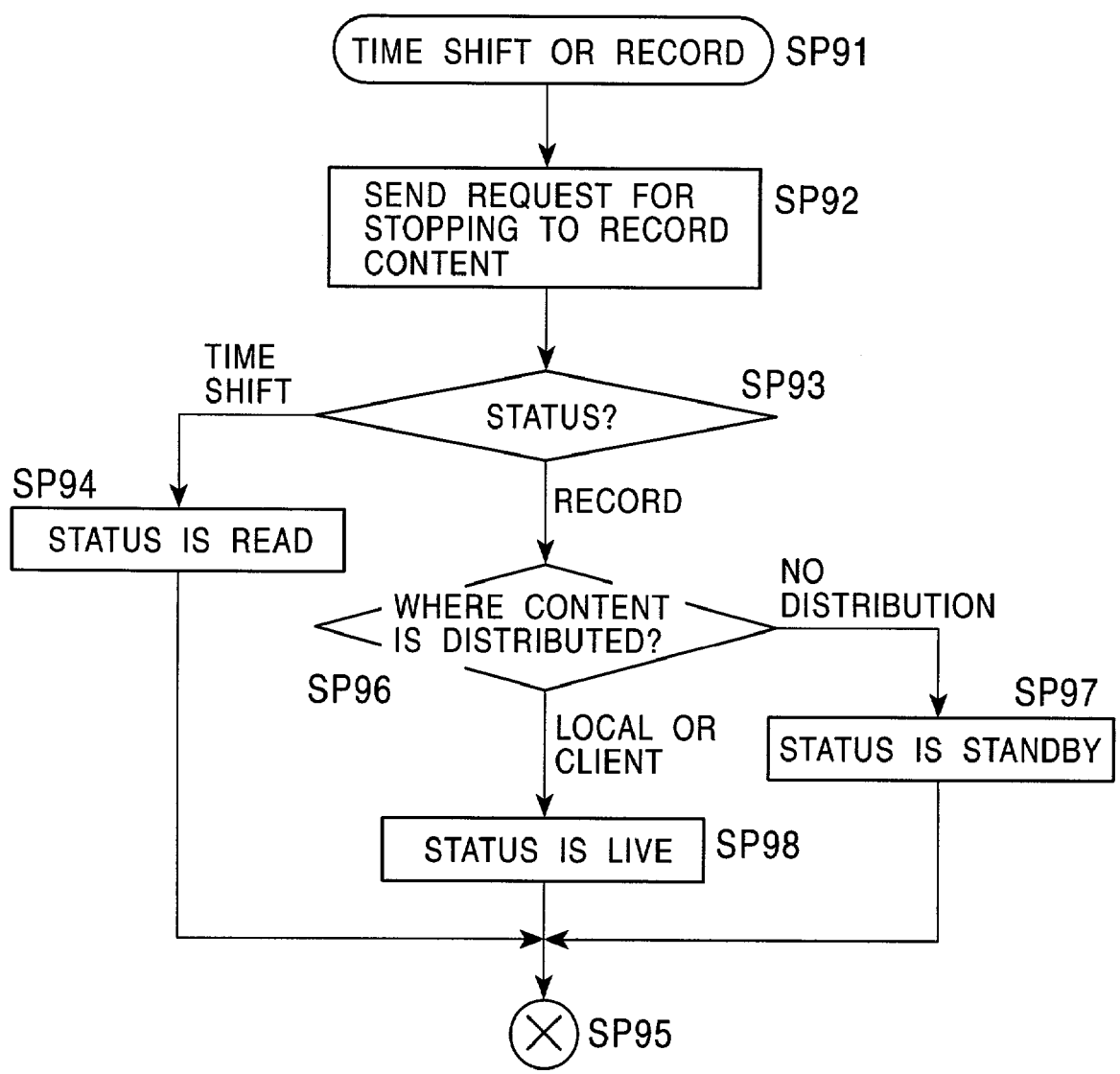
FIG. 12 is a flowchart showing the processing sequence of the control application program when a request for stopping to record content is inputted.

FIG. 12 is a flowchart showing the processing sequence when the request for stopping to record the content is inputted in the time shift or recording status. Incidentally, the control application program 16 sends a notification of an error to the client and bypasses the request when inputting the request for stopping to record the content in the status other than "time shift" and "record".

The control application program 16 advances to step SP92 from step SP91 in accordance with the input of the request for stopping to record the content and, in step SP92, it obtains the parameter corresponding to the request for stopping to record the content. Then, in step SP93, the control application program 16 determines the current status. If the current status is "time shift", the control application program 16 advances to step SP94 from step SP93. In step SP94, the control application program 16 sets the status to "read" and, thus, it stops to record the content while continuously distributing the content. Then, in step SP95, the control application program 16 ends the processing sequence.

If it is determined in step SP93 that the status is "record", the control application program 16 jumps to step SP96 from step SP93. In step SP96, the control application program 16 determines where the content is distributed. If it is determined in step SP96 that no content is distributed, the control application program 16 advances to step SP97 whereupon it sets the status to "standby". Consequently, the control application program 16 ends the recording of the content in response to the request from the client or the like and, thereafter, it advances to step SP95 whereupon the processing sequence ends.

If it is determined in step SP96 that the content is the distributed to the client or local terminal, the control application program 16 advances to step SP98 whereupon it sets the status to "live" so that the recording of the content is stopped and the live content is continuously distributed. Then, in step SP95, the control application program 16 ends the processing sequence.

Figure 13:
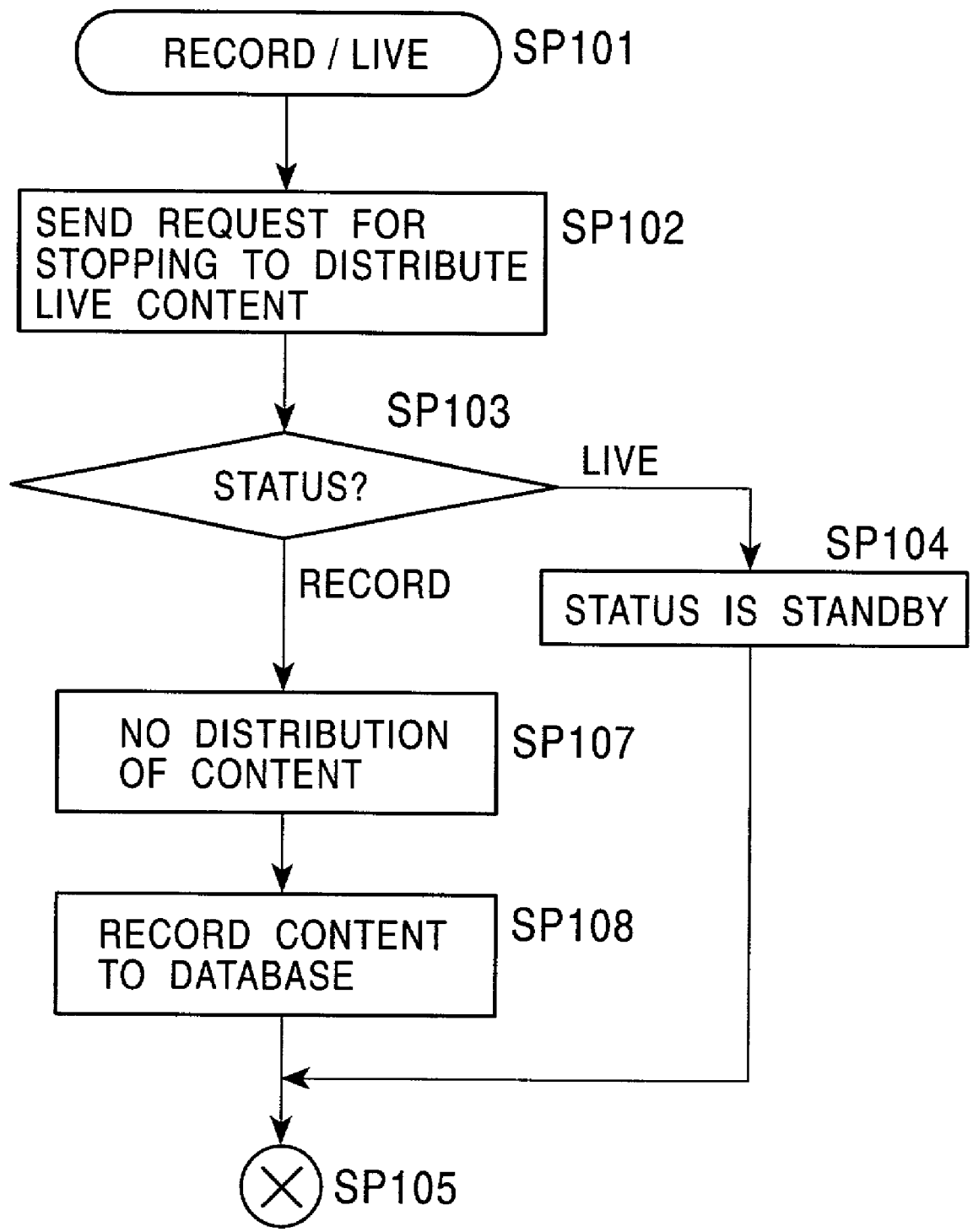
FIG. 13 is a flowchart showing the processing sequence of the control application program when a request for stopping to distribute the live content is inputted.

FIG. 13 is a flowchart showing the processing sequence when inputting the request for stopping to distribute the live content in the recording or live status. Incidentally, the control application program 16 sends a notification of an error to the client and bypasses the request when inputting the request for stopping to distribute the live content in the status other than "record" and "live".

The control application program 16 advances to step SP102 from step SP101 in accordance with the input of the request for stopping to distribute the live content and, in step SP102, it obtains the parameter corresponding to the request for stopping to distribute the live content. Then, in step SP103, the control application program 16 determines the current status. If the current status is "live", the control application program 16 advances to step SP104 from step SP103. In step SP104, the control application program 16 sets the status to "standby" and, thus, it stops to distribute the live content. Then, in step SP105, the control application program 16 ends the processing sequence.

If the recording status is determined in step SP103, the control application program 16 jumps to step SP107 from step SP103.

In step SP107, the control application program 16 sets the operation so that no live content is distributed. Thus, it stops to output the content to the monitor device 7 as the local terminal or to distribute the content to the client terminal. Then, in step SP108, the control application program 16 records the information to the database and thereafter shifts to step SP105 whereupon the processing sequence ends.

Figure 14:
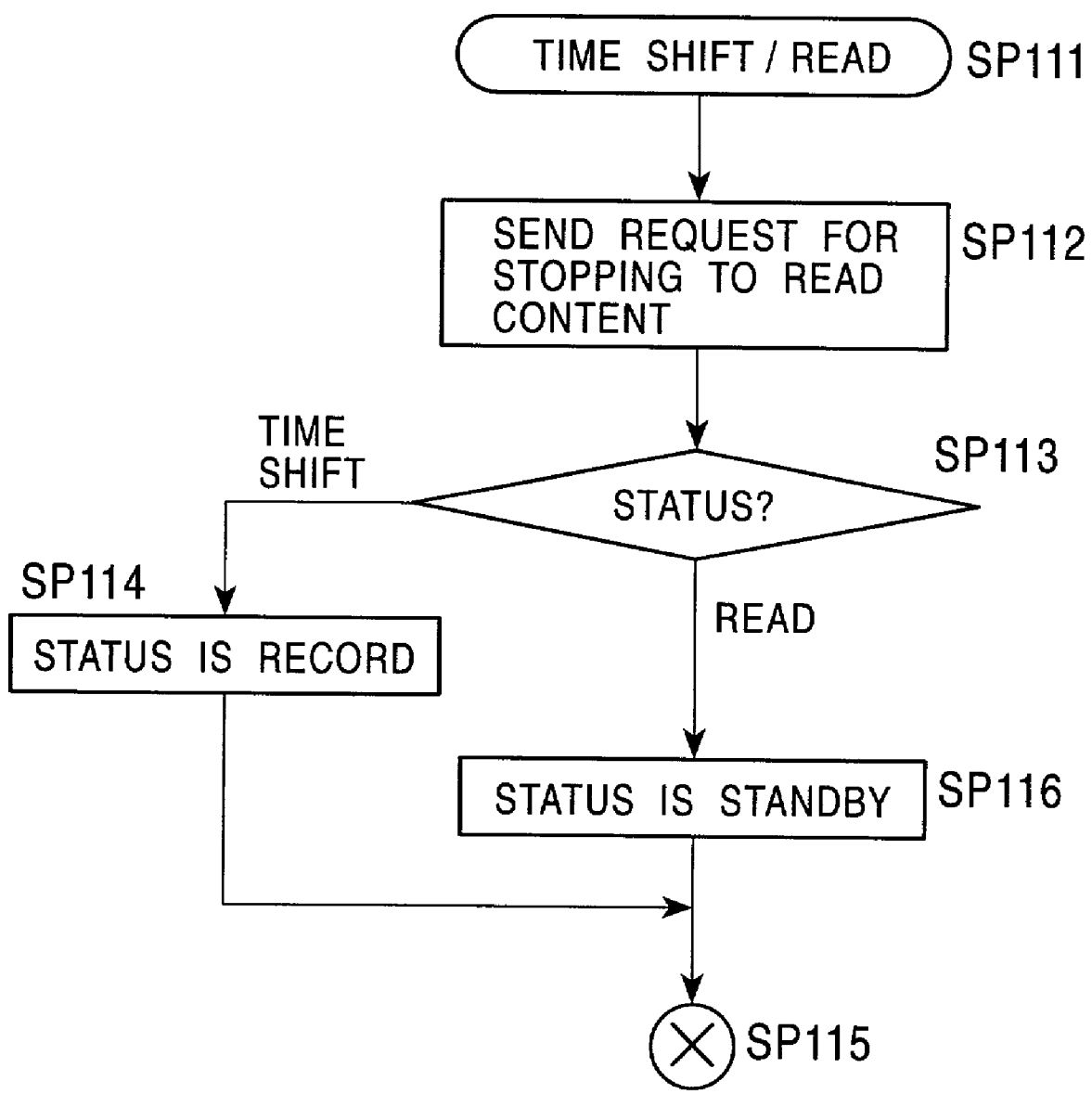
FIG. 14 is a flowchart showing the processing sequence in accordance with the control application program when a request for stopping to read content is inputted.

FIG. 14 is a flowchart showing the processing sequence when inputting the request for stopping to read the content in the time shift or reading status. Incidentally, when inputting the request for stopping to read the content in the status other than "time shift" and "read", the control application program 16 sends a notification of an error to the client and bypasses the request.

The control application program 16 advances to step SP112 from step SP111 in accordance with the input of the request for stopping to read the content and, in step SP112, it obtains the parameter corresponding to the request for stopping to read the content. Then, in step SP113, the control application program 16 determines the current status. If the current status is "time shift", the control application program 16 advances to step SP114 from step SP113. In step SP114, the control application program 16 sets the status to "record" whereupon the reading of content is stopped while continuously recording and distributing the live content. Then, in step SP115, the control application program 16 ends the processing sequence.

If it is determined in step SP113 that the status is "read", the control application program 16 jumps to step SP116 from step SP113. In step SP116, the control application program 16 sets the standby status so that the reading and distribution of the content are stopped. Then, in step SP115, the control application program 16 ends the processing sequence.

(1-2) Operation of the First Embodiment

In the content distribution system 1 (refer to FIGS. 1 and 2) with the above-mentioned configuration, the AV signal S1 consisting of the analog signal captured by the camera 2 or the like is recorded by using the client terminals 6A and 6B or the remote commander 19 and, under the control of the control application program 16, the encoder 18 A/V converts the AV signal S1. Thereafter, the converted signal is compressed to the signal in the format corresponding to the instruction and is recorded to the hard disk device 12.

When the AV signal corresponding to the recording is the AV signal S2, the decoder 17 temporarily decodes the AV signal S2 and the encoder 18 thereafter compresses the signal in the format corresponding to the instruction. Then, the compressed signal is recorded to the hard disk device 12.

The above-recorded content is read by using the client terminal 6A or 6B or the remote commander 19 and, under the control of the control application program 16, the corresponding content is read from the hard disk device 12 and is transmitted to the network 4 via the streaming server application 13 by the selector 15. If the signal format in this case is different from the format instructed by the client terminal 6A or 6B or the remote commander 19, the AV signal read from the hard disk device 12 is decoded by the decoder 17, thereafter, is converted to the corresponding format by the encoder 18, and is transmitted.

When the content transmitted to the client terminal 6A or the like is content during recording to the hard disk device 12, the content is recorded to the hard disk device 12 and is simultaneously read, that is, the content read from the hard disk device 12 is distributed by the time shift based on the "follow-up reading".

Thus, the user of the client terminal 6A or 6B can remotely enjoy the content captured from the camera 2 or the like and, further, he is free from the restriction of space and can enjoy his desired content. By viewing the content by the time shift, the user is free from the restriction of time and can enjoy the content.

The content in the format which is requested by the client terminal 6A or 6B is recorded and read upon recording the content to the hard disk device 12 or reading the content. Thereby, the content can flexibly be provided in various formats requested by the client terminals 6A and 6B.

When the content is provided as mentioned above and the client terminal 6A or the like requests the distribution of the live content, in the content distribution system 1, the encoder 18 compresses the AV signal S1. Thereafter, the compressed data is distributed via the streaming server application 13. In the case of the content comprising the digital signal, the selector 15 selects the AV signal and the selected signal is directly distributed via the streaming server application 13. Or, the decoder 17 or the encoder 18 converts the format and, then, the converted signal is distributed via the streaming server application 13.

When the reading of the content catches up with the recording by the fast feed in the distribution of the content by the time shift among these processing, in the content distribution system 1, the status is switched to the distribution of the live content when the fast-feed reading is the normal read. Thus, when the content is distributed by the so-called "follow-up reading" and read, user convenience is improved and his desired content can be provided.

When the content is distributed by the rewinding and reading and up to the head of the content is read, the status is switched to the distribution of the content by the normal reading. Consequently, the user convenience is improved and his desired content can be provided.

(1-3) Advantages of the First Embodiment

With the above configuration, the content is controllably recorded and read to the random-access recording medium via the network. At least the content read from the recording medium is transmitted to the network and, therefore, the user is free from the restriction of time and space and his desired content can be provided.

Even in the client terminal having a device having no sufficient storage capacity, various content can be used by efficient functions of the personal computer 3. In accordance therewith, the configuration of the client terminal can be simplified.

The content is recorded based on the format corresponding to the request from the client terminal and the recorded content is transmitted. Thus, the content can be provided flexibly corresponding to various client terminals in accordance with network environments.

When the content recorded to the recording medium by the fast feed catches up with the corresponding content, in place of the transmission of the content read by reading means to the network, the live content is transmitted. Thus, the user convenience is improved by realizing a fast-feed reading function which cannot be realized by a conventional streaming server.

When the content is read by a reading method using the rewinding and up to the position for starting to record the content is read, the reading in the tracing direction of the time-series is switched to the reading in the time-series direction from the position for recording and reading. Thus, the user convenience is improved by realizing a fast-feed reading function which cannot be realized by the conventional streaming server.

(2) Second Embodiment

Figure 15:
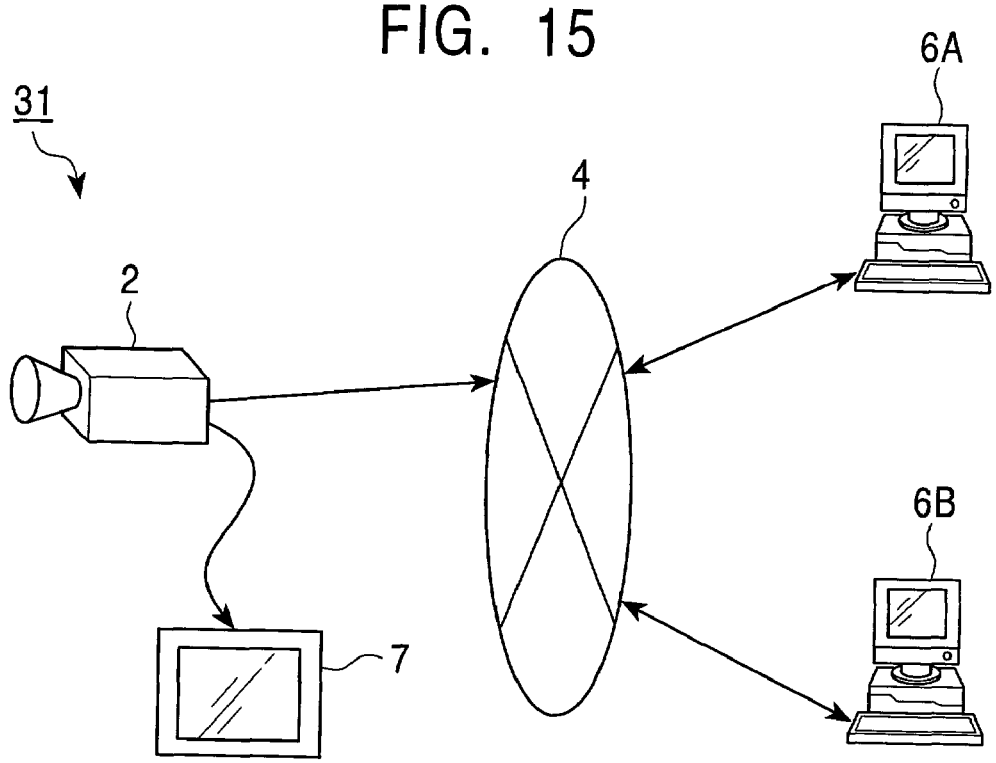
FIG. 15 is a block diagram showing a content distribution system according to a second embodiment of the present invention.

FIG. 15 is a block diagram showing a content distribution system according to a second embodiment of the present invention. In a content distribution system 31 in FIG. 15, the camera 32 is provided additionally with the function for recording, reading, and distributing the content in the above-mentioned personal computer 3 according to the first embodiment. Referring to FIG. 15, the same reference numerals designate the same components as those shown in FIG. 2. In the content distribution system 31, the user is free from the restriction of time and space and the content captured by the camera 32 can be provided.

(3) Third Embodiment

Figure 16:
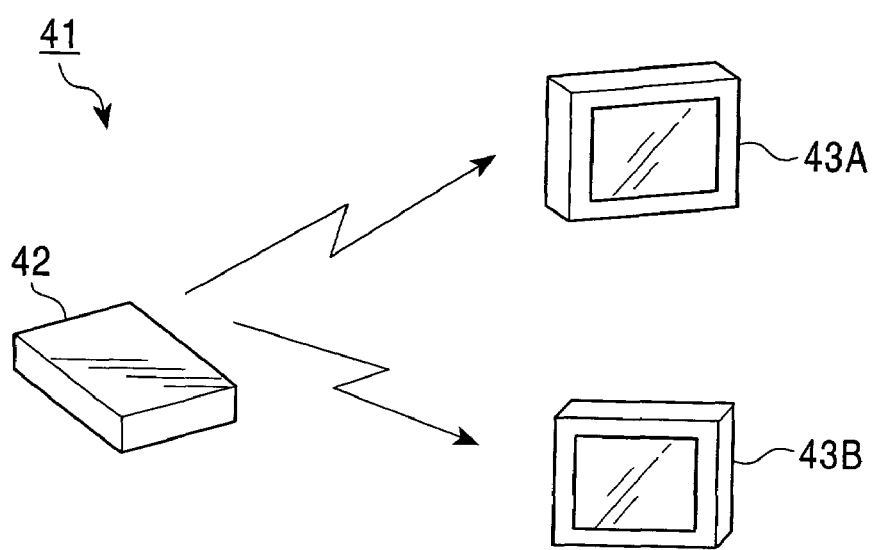
FIG. 16 is a block diagram showing a content distribution system according to a third embodiment of the present invention.

FIG. 16 is a block diagram showing a content distribution system according to a third embodiment of the present invention. In a content distribution system 41 in FIG. 16, a television receiver main body 42 receives television broadcast by various broadcasting waves. Further, the television receiver main body 42 is provided with the function for recording, reading, and distributing the content obtained by receiving the television broadcasting waves in the above-mentioned personal computer 3 according to the first embodiment. The television receiver main body 42 distributes the content to dedicated display devices 43A and 43B by radio.

The display devices 43A and 43B can portably be used. Consequently, various content received by the television receiver main body 42 can be viewed in various positions at home.

With the configuration shown in FIG. 16, the same advantages as those of the first embodiment can be obtained even when the television broadcasting content is distributed via a radio network at home or the like.

(4) Other Embodiments

According to the first to third embodiments, the content comprising the video signal and the audio signal is distributed. However, the present invention is not limited to these embodiments and can widely be applied to the distribution of music content and the like.

What is claimed is:

1. A content provider apparatus for providing content for a client terminal, comprising:

input means for inputting predetermined content;

recording and reading means for sequentially recording the content inputted by said input means to a hard disk and reading the content recorded to said hard disk;

communication means for receiving a request from the client terminal via a network for distributing the content to the client terminal via said network a selector configured to select distribution of the content inputted via the input means directly to the client terminal via said network when the request is for live distribution of the content while still recording the content inputted at the means for inputting to the hard disk, and transmit the content read from said hard disk to the client terminal via said network when the request is for a time-shift distribution of the content; and control means for controlling the operation of said recording and reading means in accordance with said request received by said communication means, wherein said control means reads the content recorded to said hard disk while recording the content to said hard disk when the time-shift distribution of the content is requested from said client terminal during the recording of the content inputted by said input means to said hard disk by said recording and reading means, and when a request for fast-feed reading, which is faster than the recording of the content to said hard disk, is received from said client terminal, the content recorded to said hard disk is discretely read in a time-series direction and, when the fast-feed reading of the content from said hard disk catches up the recording of the content to said recording medium by said recording and reading means, the fast-feed reading ends.

2. The content provider apparatus of claim 1, further comprising:

a database configured to store the request received by said communications means as a parameter to control the operation of the recording and reading means, wherein said request indicates at least one of a recording operation at the client and a live distribution of the content to the client.

3. A content provider apparatus for providing content for a client terminal, comprising:

an interface configured to receive predetermined content;

recording and reading unit configured to sequentially record the received content to a hard disk and read the content recorded to said hard disk;

an interface configured to receive a request from the client terminal via a network for distributing the content to the client terminal via said network;

a selector configured to configured to select distribution of the content inputted via the interface directly to the client terminal via said network when the request is for live distribution of the content while still recording the content inputted at the interface to the hard disk, and transmit the content read from said hard disk to the client terminal via said network when the request is for a time-shift distribution of the content; and a controller configured to control the operation of said recording and reading unit in accordance with said request received by said interface, wherein said controller reads the content recorded to said hard disk while recording the content to said hard disk when the time-shift distribution of the content is requested from said client terminal during the recording of the content inputted by said interface to said hard disk by said recording and reading unit, and when a request for fast-feed reading, which is faster than the recording of the content to said hard disk, is received from said client terminal, the content recorded to said hard disk is discretely read in a time-series direction and, when the fast-feed reading of the content from said hard disk catches up the recording of the content to said hard disk by said recording and reading means, the fast-feed reading ends.

4. The content provider apparatus of claim 3, further comprising:

a database configured to store the request received by said interface as a parameter to control the operation of the recording and reading unit, wherein said request indicates at least one of a recording operation at the client and a live distribution of the content to the client.

* * * * *